(12) United States Patent
Hüffer et al.

(10) Patent No.: US 7,132,488 B2
(45) Date of Patent: Nov. 7, 2006

(54) METHOD FOR PRODUCING HOMOPOLYMERS AND COPOLYMERS OF ISOBUTENE

(75) Inventors: Stephan Hüffer, Ludwigshafen (DE); Hans Peter Rath, Grünstadt (DE); Gabriele Lang, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/433,438

(22) PCT Filed: Dec. 11, 2001

(86) PCT No.: PCT/EP01/14546

§ 371 (c)(1), (2), (4) Date: Jun. 4, 2003

(87) PCT Pub. No.: WO02/48216

PCT Pub. Date: Jun. 20, 2002

(65) Prior Publication Data

US 2004/0014911 A1 Jan. 22, 2004

(30) Foreign Application Priority Data

Dec. 12, 2000 (DE) ................. 100 61 715

(51) Int. Cl.
*C08F 10/10* (2006.01)
*C08F 210/10* (2006.01)
*C08F 4/12* (2006.01)

(52) U.S. Cl. ............... 526/237; 527/194; 527/348.7

(58) Field of Classification Search ........... 526/237, 526/348.7, 194
See application file for complete search history.

(56) References Cited

U.S. PATENT DOCUMENTS

| 4,152,499 A | 5/1979 | Boerzel et al. |
| 4,327,201 A | 4/1982 | Kennedy et al. |
| 4,946,899 A | 8/1990 | Kennedy et al. |
| 5,169,914 A | 12/1992 | Kaszas et al. |
| 5,247,021 A | 9/1993 | Fujisawa et al. |
| 5,286,823 A | 2/1994 | Rath |
| 5,910,550 A | 6/1999 | Rath |
| 6,407,186 B1 | 6/2002 | Rath et al. |

FOREIGN PATENT DOCUMENTS

| EP | 145 235 | 6/1985 |
| EP | 206 756 | 12/1986 |
| EP | 265 053 | 4/1988 |
| EP | 671 419 | 9/1995 |
| EP | 713 883 | 5/1996 |
| EP | 722 957 | 7/1996 |

OTHER PUBLICATIONS

Derwent Abst. DW 92-133629 (EP 481 297).
Kennedy et al., Designed Polymers by Carbocationic.
Macromolecular Engineering Theory and Practice, 96-103,1991.

*Primary Examiner*—Caixia Lu
(74) *Attorney, Agent, or Firm*—Novak, Druce, Deluca & Quigg, LLP; Jason D. Voight

(57) ABSTRACT

In a process for the polymerization of isobutene or mixtures of isobutene with ethylenically unsaturated comonomers under the conditions of living cationic polymerization, the initiator system additionally comprises at least one nonpolymerizable, aprotic organosilicon compound having at least one Si—O bond.

14 Claims, No Drawings

METHOD FOR PRODUCING HOMOPOLYMERS AND COPOLYMERS OF ISOBUTENE

The present invention relates to the preparation of homo- and copolymers of isobutene by cationic polymerization of isobutene or mixtures of isobutene with ethylenically unsaturated comonomers which copolymerize with isobutene under the conditions of a cationic polymerization.

Polyisobutene and its copolymers are used in various ways, for example for the preparation of fuel and lubricant additives, as elastomers, as adhesives or adhesive raw materials, as a base component of sealing compounds and sealants, in coating systems, in particular those having a water vapor barrier effect, and in chewing gum materials. Block copolymers of isobutene with vinylaromatic monomers are distinguished, for example, by their elastomer properties and their high tightness against permeation by gases.

The cationic polymerization of isobutene is frequently carried out by boron trifluoride catalysis, in particular by polymerization of isobutene in the presence of boron trifluoride complex catalysts. Processes for this purpose are comprehensively described in the prior art (cf. for example DE-A 27 02 604, EP-A 145 235, EP-A 481 297, EP-A 671 419, EP-A 628 575, EP-A 807 641 and WO 99/31151).

Kennedy et al. describe homo- and copolymerization of isobutene under the conditions of a living cationic polymerization (cf. J. P. Kennedy et al. in U.S. Pat. Nos. 4,946,899, 4,327,201, 5,169,914, EP-A 206 756 and EP-A 265 053, and comprehensively in J. P. Kennedy, B. Ivan, Designed Polymers by Carbocationic Macromolecular Engineering, Oxford University Press, New York 1991). The initiator system used for the cationic polymerization comprises, as a rule, at least one Lewis acid/metal halide as catalyst and at least one organic compound which forms a carbocation or a cationic complex with the Lewis acid under the reaction conditions. Although the living cationic polymerization leads to polymers having high molecular uniformity and moreover, in contrast to boron trifluoride complex catalysis, also permits the controlled preparation of block copolymers and of terminally functionalized polymers, it has to date been only of academic importance. This is presumably due to the difficulty of controling it and its high requirement with respect to the purity of the reagents used.

It has been reported variously that the reactivity of the initiator systems used for the living cationic polymerization can be controlled by adding donors. These are aprotic compounds having a nucleophilic, free electron pair. Examples of such donors are amides, such as N,N-dimethylacetamide and pyridine compounds. However, the use of such donors frequently results in poorly soluble precipitates on the reactor walls, which adversely affect the quality of the polymerization product. The Applicant presumes that these deposits are due to the formation of poorly soluble adducts of donor compound and Lewis acid. The inhomogeneities produced here lead in particular to a deterioration in the molecular uniformity. Moreover, particularly in the case of continuous processes, there is the danger that the deposits will lead to blockages, which may prevent control of the polymerization and, in an extreme case, may lead to the destruction of the plant.

It is an object of the present invention to provide a process for the polymerization of isobutene and isobutene-containing monomer mixtures which leads to products having high molecular uniformity. Moreover, the process should not lead to deposits on the reactor walls to any significant extent, if at all, so that a continuous reaction procedure is possible.

We have found that this object is achieved, surprisingly, by a polymerization process of isobutene or mixtures of isobutene with ethylenically unsaturated comonomers under the conditions of a living cationic polymerization, in which the initiator system additionally comprises at least one nonpolymerizable, aprotic organosilicon compound having at least Si—O bond. It is presumed that the organosilicon compound acts as a donor.

The present invention accordingly relates to a process for the preparation of homo- and copolymers of isobutene by cationic polymerization of isobutene or mixtures of isobutene with ethylenically unsaturated comonomers in the presence of an initiator system comprising:

i) a Lewis acid selected from covalent (semi)metal-halogen compounds ii) at least one aprotic organic compound I having at least one functional group FG which, under polymerization conditions, forms a carbocation or a cationic complex with the Lewis acid, in an organic solvent which is inert to the Lewis acid, wherein the initiator system additionally iii) comprises at least one nonpolymerizable, aprotic organosilicon compound II having at least one Si—O bond.

In the novel process, the polymerization of the isobutene is initiated by the initiator system comprising at least one Lewis acid, at least one organic compound I and at least one donor compound II which is an organosilicon compound having at least one Si—O bond. It is assumed that the Lewis acid forms, with compound I, a carbocation or at least a cationic complex which interacts with the olefinically unsaturated double bond of the isobutene or of the comonomer and generates a positive (partial) charge in the monomer, for example on the tertiary carbon atom of the isobutene. This in turn interacts with a further isobutene molecule or a further monomer with continuation of the polymerization reaction. Suitable compounds I are therefore all those compounds which are known to form a carbocation or at least a cationic complex with the abovementioned Lewis acids. It is assumed that the complex formed by compound I and the Lewis acid is stabilized by the donor compound II or at least modified with regard to its reactivity.

The terms carbocation and cationic complex are not strictly separated from one another but include all intermediate stages of solvent-separated ions, solvent-separated ion pairs, contact pairs and strongly polarized complexes having a positive partial charge on a carbon atom of compound I.

Suitable compounds of the formula I are in principle all organic compounds which have at least one nucleophilic displaceable leaving group X and which can stabilize a positive charge or partial charge on the carbon atom which carries the leaving group X. These are known to include compounds which have at least one leaving group X which is bonded to a secondary or tertiary aliphatic carbon atom or to an allylic or benzylic carbon atom. Suitable leaving groups are in particular halogen, $C_1$–$C_6$-alkoxy and $C_1$–$C_6$-acyloxy.

Here, halogen is in particular chlorine, bromine or iodine, especially chlorine. $C_1$–$C_6$-Alkoxy may be either linear or branched and is, for example, methoxy, ethoxy, n-propoxy, isopropoxy, n-butoxy, isobutoxy, n-pentyloxy or n-hexyloxy. $C_1$–$C_6$-Alkylcarbonyloxy is, for example, acetoxy, propionyloxy, n-butyroxy or isobutyroxy.

Preferred such compounds of the formula I are those in which the functional group is of the formula FG

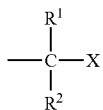

(FG)

in which

X is selected from halogen, $C_1$–$C_6$-alkoxy and $C_1$–$C_6$-acyloxy, $R^1$ is hydrogen or methyl and $R^2$ is methyl or, with $R^1$ or the moiety to which the functional group FG is bonded, forms a $C_5$- or $C_6$-cycloalkyl ring, and $R^2$ may furthermore be hydrogen if the functional group FG is bonded to an aromatic or olefinically unsaturated carbon atom.

The compounds of the formula I preferably have one, two, three or four, in particular one or two, functional groups FG. X in the formula (FG) is preferably a halogen atom, in particular chlorine.

Preferred compounds I are, for example, of the formulae I-A to I-D:

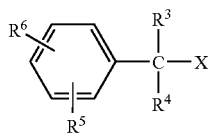
(I-A)

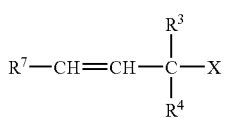
(I-B)

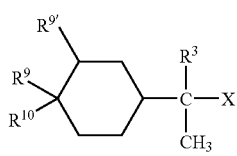
(I-C)

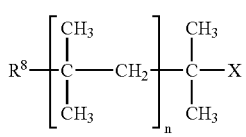
(I-D)

in which X has the abovementioned meanings, n is 0, 1, 2, 3, 4 or 5, $R^3$, $R^4$ und $R^{10}$, independently of one another, are each hydrogen or methyl, $R^5$, $R^6$ and $R^7$, independently of one another are each hydrogen, $C_1$–$C_4$-alkyl or a group $CR^3R^4$-X, where $R^3$, $R^4$ and X have the abovementioned meanings, and $R^8$ is hydrogen, methyl or a group X and $R^9$ and $R^{9'}$ are each hydrogen or a group X.

In the formulae I-A to I-D, $R^3$ and $R^4$ are preferably both methyl. In the formula I-A, $R^6$ is, for example, a group $CR^3R^4$-X which is arranged para to the $CR^3R^4X$ group if $R^5$ is hydrogen. It may also be in the meta-position if $R^5$ is $C_1$–$C_4$-alkyl or a $CR^3R^4$-X group. Preferred compounds I-A are, for example, 2-chloro-2-phenylpropane (cumyl chloride) and 1,4-bis(2-chloroprop-2-yl)benzene (para-dicumyl dichloride).

In formula I-B, $R^7$ is preferably a $CR^3R^4$-X group or hydrogen. Examples of compounds of formula I-B are allyl chloride, methallyl chloride, 2-chloro-2-methylbut-2-ene and 2,5-dichloro-2,5-dimethylhex-3-ene.

In the compounds I-C, $R^3$ is preferably methyl. $R^2$ is preferably likewise methyl. $R^9$ is preferably a group X, and in particular is halogen, particularly if $R^{10}$ is methyl. Examples of compounds of the formula I-C are 1,8-dichloro-4-p-menthane (limonene dihydrochloride), 1,8-dibromo-4-p-menthane (limonene dihydrobromide), 1-(1-chloroethyl-3-chlorocyclohexane, 1-(1-chloroethyl-4-chlorocyclohexane, 1-(1-bromoethyl)-3-bromocyclohexane and 1-(1-bromethyl)-4-bromocyclohexane.

Among the compounds of the formula I-D, those in which $R^8$ is methyl are preferred. Preferred compounds of the formula I-D are those in which $R^8$ is a group X, and in particular a halogen atom, if n is >0.

With regard to the use of the polyisobutenes prepared by the novel process as fuel or lubricant additives, preferred compounds I are the compounds of the formula I-D, and among these in particular those in which X is halogen. In the formula I-D, n is preferably 1, 2, 3 or 4, in particular 1 or 2, or is 0 when $R^8$ is methyl. For many other purposes, in particular for the preparation of medium and relatively high molecular weight polymers, for example having molecular weights above 2000, in particular above 3000, Dalton, the compounds I-A are preferred.

As a rule, the compound I is used in the novel process in an amount of at least $10^{-6}$ mol per mol of isobutene or per mol of polymerizable monomers, in order to provide a sufficient concentration of initiator complexes. As a rule, the amount of the compounds I will not exceed 1 mol per mol of monomers to be polymerized (or isobutene). This and the data given below regarding amounts of the compound I are always based on the number of functional groups (FG) in the compound I, unless stated therwise. Preferably, the compounds of the formula I are used in an amount of from $10^{-5}$ to $10^{-1}$, in particular from $10^{-4}$ to $5 \times 10^{-2}$, mol, based on the functional groups (FG) of the compound I, per mol of isobutene or polymerizable monomers. Here, it should be noted that the achieved molecular weight of the polyisobutene prepared by the novel process is dependent on the amount of compound I in such a way that the molecular weight of the polyisobutene decreases with increasing concentration of compound I.

Suitable Lewis acids are in principle covalent metal halides and semimetal halides, which as a rule have a missing electron pair. Such compounds are known to a person skilled in the art, for example from Kennedy et al., loc. cit., and as a rule are selected from covalent metal-halogen compounds of titanium, of tin, of aluminum, of vanadium or of iron, and the halides of boron. The chlorides are preferred and, in the case of aluminum, also the monoalkylaluminum chlorides and the dialkylaluminum chlorides. Examples of preferred Lewis acids are titanium (IV) chloride, boron trichloride, tin(IV) chloride, aluminum trichloride, vanadium(V) chloride, iron(III) chloride, $C_1$–$C_6$-alkyl-$AlCl_2$ and ($C_1$–$C_6$-alykyl)$_2$AlCl. Particularly preferred Lewis acids are titanium(IV) chloride and boron trichloride.

The Lewis acid is of course used in the novel process in an amount which is sufficient for formation of the initiator complex. This is as a rule ensured even at low concentrations of Lewis acid in the reaction medium. Preferably, the molar ratio of Lewis acid to compound I is from 20:1 to 1:20, in particular from 10:1 to 1:10. The concentration of the Lewis acid in the reaction medium is as a rule from $10^{-3}$ to 1, preferably from $5 \times 10^{-3}$ to 0.3, in particular from 0.01 to 0.2, mol/l.

The nonpolymerizable, aprotic organosilicon compounds II are as a rule those compounds which have at least one organic radical bonded via an oxygen atom and having as a rule 1 to 20 carbon atoms. Examples of such radicals are alkoxy, cycloalkoxy, aryloxyl, arylalkoxy and acyloxy (alkylcarbonyloxy).

Alkyl is understood as meaning a linear or branched saturated hydrocarbon radical of, as a rule, 1 to 20, preferably 1 to 10, carbon atoms, such as methyl, ethyl, n-propyl, isopropyl, n-butyl, isobutyl, tert-butyl, 2-butyl, n-pentyl, 2-methylbut-1-yl, 2-methylpent-1-yl, 2-ethylbut-1-yl, n-hexyl, 2-methylhex-1-yl, 2-ethylhex-1-yl, n-heptyl, n-octyl, isooctyl, n-decyl and comparable radicals.

Aryl is an aromatic hydrocarbon radical of, as a rule, 6 to 20 carbon atoms, such as phenyl, naphthyl and comparable groups which may have one or more $C_1$–$C_{10}$-alkyl groups as substituents, e.g. tolyl, isopropylphenyl, xylyl or tert-butylphenyl.

Here, cycloalkyl is as a rule a 5-, 6- or 7-membered, saturated carbocyclic structure which may have one or more $C_1$–$C_{10}$-alkyl groups as substituents.

Arylalkyl is an aryl radical of, as a rule, 1 to 10, preferably 1 to 4, carbon atoms, which is substituted by an aryl radical as defined above, e.g. is benzyl or 2-phenylethyl.

Alkyloxy is alkyl bonded via an oxygen atom. Accordingly, aryloxy, cycloalkoxy and arylalkoxy are aryl, cycloalkyl and arylalkyl, respectively, bonded via an oxygen atom.

Acyloxy is an alkylcarbonyl radical which is bonded via oxygen and preferably has 1 to 6 carbon atoms in the alkyl moiety, for example is acetoxy, propionyloxy, butyroxy, etc.

The organosilicon compounds II may have one or more, e.g. 2 or 3, silicon atoms with at least one organic radical bonded via oxygen. Preferred organosilicon compounds II are those which have one, two or three, in particular 2 or 3, radicals bonded via oxygen per silicon atom.

Preferred organosilicon compounds are those which are of the formula II:

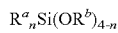

where n is 1, 2 or 3, $R^a$ may be identical or different and, independently of one another, are each $C_1$–$C_{20}$-alkyl, $C_5$–$C_7$-cycloalkyl, aryl or aryl-$C_1$–$C_4$-alkyl, it being possible for the three last-mentioned radicals also to have one or more $C_1$–$C_{10}$-alkyl groups as substituents, and $R^b$ are identical or different and are each $C_1$–$C_{20}$-alkyl or, where n is 1 or 2, two different radicals Rb together may also form a 2- or 3-membered alkylene unit.

In formula II, n is preferably 1 or 2. $R^a$ is preferably $C_1$–$C_8$-alkyl and in particular alkyl which is branched or is bonded via a secondary carbon atom, such as isopropyl, isobutyl, 2-butyl or a 5-, 6- or 7-membered cycloalkyl group. $R^b$ is preferably $C_1$–$C_4$-alkyl.

Examples of such preferred compounds are dimethoxydiisopropylsilane, dimethoxyisobutylisopropylsilane, dimethoxydiisobutylsilane, dimethoxydicyclopentylsilane, dimethoxyisobutyl-2-butylsilane, diethoxyisobutylisopropylsilane, triethoxytoluylsilane and triethoxybenzylsilane.

In the novel process, the organosilicon compound II is used in an amount such that the molar ratio of silicon atoms in the organosilicon compound II to the metal atoms or the semimetal atoms in the Lewis acid is from 0.05:1 to 50:1, preferably from 0.1:1 to 10:1, particularly preferably from 0.1:1 to 2:1. Very particularly preferably the organosilicon compound II is used in a substoichiometric amount (calculated as the ratio of the silicon atoms to the (semi)metal atoms).

Both isobutene as such and monomer mixtures of isobutene with olefinically unsaturated monomers which are known to be copolymerizable with isobutene under cationic polymerization conditions can be reacted by the novel process. The novel process is moreover suitable for the block copolymerization of isobutene with ethylenically unsaturated comonomers polymerizable under cationic polymerization conditions. If monomer mixtures of isobutene are to be polymerized with suitable comonomers, the monomer mixture preferably contains more than 80, in particular more than 90, particularly preferably more than 95, % by weight of isobutene and less than 20, preferably less than 10, in particular less than 5, % by weight of comonomers.

Suitable copolymerizable monomers are vinylaromatics, such as styrene and a-methylstyrene, $C_1$–$C_4$-alkylstyrenes, such as 2-, 3- and 4-methylstyrene, and 4-tert-butylstyrene, isoolefins of 5 to 10 carbon atoms, such as 2-methylbut-1-ene, 2-methylpent-1-ene, 2-methylhex-1-ene, 2-ethylpent-1-ene, 2-ethylhex-1-ene and 2-propylhept-1-ene. Suitable comonomers are furthermore olefins which have a silyl group, such as 1-trimethoxysilylethene, 1-(trimethoxysilyl) propene, 1-(trimethoxysilyl)-2-methylprop-2-ene, 1-[tri (methoxyethoxy)silyl]ethene, 1-[tri(methoxyethoxy)silyl] propene and 1-[tri(methoxyethoxy)silyl]-methylprop-2-ene.

Preferred embodiments of the novel process relate to the homopolymerization of isobutene or isobutene-containing starting aterials and the block copolymerization of isobutene with vinylaromatic monomers. Here, the isobutene starting materials contain, as a rule, less than 5% by weight, based on the total amount of the isobutene-containing starting material, of copolymerizable monomers. For the block copolymerization, this is true in an analogous manner also for the vinylaromatic monomers.

Suitable isobutene starting materials for the novel process are both isobutene itself and isobutene-containing $C_4$-hydrocarbon streams, for example refined $C_4$ fractions, $C_4$-cuts from isobutene dehydrogenation, $C_4$-cuts from steam crackers and FCC crackers (FCC: Fluid Catalysed Cracking), provided that they have been substantially freed from 1,3-butadiene contained therein. $C_4$-Hydrocarbon streams suitable according to the invention contain, as a rule, less than 500, preferably less than 200, ppm of butadiene. When $C_4$-cuts are used as starting material, the hydrocarbons other than isobutene play the role of an inert solvent.

As a rule, the novel process is carried out at below 0° C., for example from 0 to –140° C., preferably from –30 to –120° C., particularly preferably from –40 to –110° C. The reaction pressure is of minor importance and depends in a known manner on the apparatuses used and other reaction conditions.

Suitable solvents are all organic compounds which differ from the compounds I and II and the polymerizable monomers, in particular isobutene, and which have no abstractable protons. Preferred solvents are acyclic alkanes of 2 to 8, preferably 3 to 6, carbon atoms, such as ethane, isopropane, n-propane, n-butane and its isomers, n-pentane and its isomers, n-hexane and its isomers and n-pentane and its isomers, cycloalkanes of 5 to 8 carbon atoms, such as cyclopentane, cyclohexane and cycloheptane, acyclic alkenes of, preferably, 2 to 8 carbon atoms, such as ethene, isoprene, n-propene, n-butene, n-pentene, n-hexene and n-heptene, cyclic olefins, such as cyclopentene, cyclohexene and cycloheptene, aromatic hydrocarbons, such as toluene, xylene, ethylbenzene or chlorobenzene, halogenated alkanes of 1 to 5 carbon atoms and 1, 2, 3, 4, 5 or 6 halogen atoms, selected from fluorine and in particular chlorine, such as methyl chloride, dichloromethane, trichloromethane, ethyl chloride, 1,2-dichloroethane and 1,1,1-trichloroethane and chloroform.

It is not only the solvents as such that are suitable but also mixtures of these solvents. Mixtures are preferred particularly when the solvent has a melting point above the desired polymerization temperature.

Solvents and solvent mixtures which comprise at least one cyclic or alicyclic alkane and/or an α-olefin are particularly preferred. Particularly preferred among these are solvent mixtures which comprise at least one nonhalogenated hydrocarbon and at least one halogenated hydrocarbon, preferably an aliphatic or cycloaliphatic alkane and chlorinated hydrocarbons. Of course, the chlorinated hydrocarbons do not include any compound in which chlorine atoms are present on secondary or tertiary carbon atoms.

The polymerization is of course carried out under substantially aprotic, in particular under anhydrous, reaction conditions. Aprotic or anhydrous reaction conditions are understood as meaning that the water content (or the content of protic impurities) in the reaction mixture is less than 50 ppm, in particular less than 5 ppm. As a rule, the starting materials are therefore dried physically and/or by chemical measures before they are used. For example, after conventional preliminary purification and preliminary drying, the aliphatic or cycloaliphatic hydrocarbons preferably used as solvents can be mixed with an organometallic compound, for example an organolithium compound, for example an organolithium, organomagnesium or organoaluminum compound, in an amount sufficient for removing traces of water from the solvent. The solvent treated in this manner can be condensed directly into the reaction vessel. It is also possible to proceed in a similar manner with the α-olefins, the aromatic hydrocarbons and the monomers to be polymerized, in particular the isobutene.

The preliminary purification or preliminary drying of the solvents and of the isobutene is effected in a conventional manner, preferably by treatment with solid drying agents, such as molecular sieves or predried oxides, such as calcium oxide or barium oxide. The starting materials for which treatment with metal alkyls is not suitable, for example the alkyl halides used as solvents and the compounds I and II, can be dried in an analogous manner.

The polymerization of the isobutene or of the isobutene-containing monomer mixture takes place spontaneously on mixing of the initiator system used according to the invention with the isobutene or with the isobutene-containing monomer mixture in the inert organic solvent at the desired reaction temperature. Here, for example, it is possible to proceed in such a way that isobutene or the monomer mixture is initially taken in the inert solvent and cooled to the reaction temperature and the initiator system then added. It is also possible to proceed in such a way that the initiator system is initially taken in the solvent and then the isobutene or the isobutene-containing monomer mixture is added all at once or at the rate at which it is consumed. In addition, a part or the total amount of the isobutene or of the isobutene-containing monomer mixture can be initially taken in the solvent and the initiator system then added. The remaining amounts of isobutene or isobutene-containing monomer mixture are then added in the course of the reaction, for example at the rate at which it is consumed.

The initiator system is as a rule added by introducing the components of the initiator system separately. In the batch-wise procedure, as a rule, the compound I and the compound II are first added, followed by the Lewis acid. The time of addition of the initiator is then considered to be the time when all components of the initiator system are present in the reaction vessel. For example it is possible for first the solvent, then the compound I and the compound II and then a part of the total amount of the isobutene or of the isobutene-containing starting material to be additionally taken, the polymerization initiated by adding the Lewis acid and then, if required, any remaining amounts of isobutene or isobutene-containing starting materials fed to the polymerization. However, it is also possible for first the solvent, then the Lewis acid and then a part or the total amount of the isobutene or of the isobutene-containing starting material to be initially taken and then the polymerization initiated by adding the compound I and the compound II.

In addition to the batchwise procedure described here, the polymerization can also be designed as a continuous process. Here, the starting materials, i.e. the monomers to be polymerized, the solvent and the initiator system, are fed continuously to the polymerization reaction and the reaction product is removed continuously, so that more or less steady-state polymerization conditions are established in the reactor. The components of the initiator system can be fed in either separately or together, preferably diluted in the solvent. The isobutene to be polymerized or the isobutene-containing monomer mixture can be fed in as such, diluted with a solvent or as an isobutene-containing hydrocarbon stream.

For example, the addition of the components of the isobutene system diluted in the solvent can be effected via multimaterial nozzles in order to achieve thorough mixing of the components.

The removal of the heat of reaction in the batchwise as well as in the continuous reaction is effected in a conventional manner, for example by means of internally installed heat exchangers and/or by cooling of the walls and/or by utilizing evaporative cooling. Here, the use of ethene and/or mixtures of ethene with other hydrocarbons and/or halohydrocarbons as solvent has proven particularly useful since ethene is not only economical but also has a boiling point in the desired polymerization temperature range.

In principle, all reactors as usually used for cationic polymerization of isobutene, for example cationic polymerization of isobutene with boron trifluoride-oxygen complexes, are suitable as reaction vessels for carrying out the novel process. To this extent, reference is made here to the relevant prior art. In the batchwise reaction procedure, the stirred kettles which are customary for this purpose and are preferably equipped with evaporative cooling, suitable mixers, feeds, heat exchanger elements and blanketing apparatuses are suitable. The continuous reaction procedure can be carried out in the reaction kettles, reaction cascades, tubular reactors, tube-bundle reactors, in particular tubular and tube-bundle reactors arranged in a circle, which are preferably equipped in the manner described above for reaction kettles.

In order to recover the isobutenes from the reaction mixture, the latter is deactivated after the polymerization in the manner customary for cationic polymerization reactions, preferably by adding a protic compound, in particular by adding alcohols, such as methanol, ethanol, n-propanol, isopropanol, n-butanol, isobutanol, sec-butanol or tert-butanol, or mixtures thereof with water. Preferably, the substances used for the deactivation are employed in a diluent, for example one of the solvents, in order to avoid an undesired increase in viscosity. Otherwise, here too reference may be made to the prior art cited at the outset and relating to the polymerization of boron trifluoride with isobutene, whose working-up measures can be applied in an analogous manner to the novel process.

In a further embodiment of the invention, the polymerization is stopped by adding a trialkylallylsilane compound, for example by adding trimethylallylsilane (($CH_3)_3$Si—$CH_2$—CH=$CH_2$). Such compounds are usually used in amounts of from 0.3 to 3, preferably from 0.5 to 1.5, mol per mol of functional groups FG. The use of the allylsilane leads to stoppage of the polymerization with introduction of a propenyl group at the end of the polymer chain. For further details relating to this reaction, reference is made at this point to EP-A 713 883.

Preferably, the composition used for the deactivation or the mixture thereof with an inert solvent is cooled to polymerization temperature before the deactivation, in order to avoid undesired secondary reactions.

The solvent is then removed in suitable units, such as rotary, falling-film or thin-film evaporators, or by means of flash evaporation (this is understood as meaning letting down the reaction solution downstream of a heat exchanger into pipelines or via a perforated plate or die plate). For removal of the solvent, reduced pressure is preferably applied, for example from 0.1 to 800, in particular from 1 to 100, mbar. Bottom temperatures of from 50° to 250° C., in particular from 150 to 220° C., are preferred.

For the preparation of block copolymers of isobutene and vinylaromatic monomers, as a rule the first isobutene or a monomer mixture substantially comprising isobutene, in one of the abovementioned solvents, is reacted in the presence of the novel initiator system at, preferably, below 0° C., in particular from –20 to –120° C., particularly preferably from –50 to –110° C., until the desired conversion of the isobutene is reached. The vinylaromatic monomers are then added to produce the further polymer blocks. During or after the addition of the vinylaromatic monomers, the reaction temperature can be maintained or, depending on the reactivity of the vinylaromatic compound, can be increased. The polymerization of the vinylaromatic monomers is preferably carried out at above –50° C., for example from –50 to +50° C. As a rule, the polymerization of the isobutene is continued until a conversion of at least 80%, preferably at least 90%, before the vinylaromatic monomers are added. The addition of the vinylaromatic monomers is preferably effected before 99%, in particular before 98%, of the isobutene have reacted, since otherwise there is the danger that some of the active terminal groups will be deactivated.

This ensures the initial formation of a polymer block which is substantially composed of isobutene units and carries, at one end or, with the use of polyfunctionalized compounds I, at its ends, polymer blocks which are composed of vinylaromatic monomers, and which are substantially unsegmented, i.e. free of isobutene units. Such block copolymers are of interest in particular as sealing materials.

The novel process is moreover particularly suitable for the prepration of polyisobutenes, i.e. polymers which are composed of at least 80, preferably at least 90, % of isobutene in the form of polymerized units. Polyisobutenes having number average molecular weights ($M_n$) of from 400 to 400000, preferably from 500 to 200000 particularly preferably from 700 to 100000, Dalton, are obtainable by the novel process. Preferably, the process of the invention is suitable for the preparation of polyisobutenes having number average molecular weights above 2000, in particular above 3000, Dalton. The molecular weight can be varied by a person skilled in the art in a simple manner by varying the concentration of compound I used, a high concentration of compound I leading to polymers having a low molecular weight and a low concentration of compound I leading to polymers having higher molecular weights. The same also applies to the preparation of the vinylaromatic polymer blocks in the block copolymers. In addition, the polymers obtained from the novel process have functional terminal groups, for example halogen atoms or olefinically unsaturated double bonds, which can be used for further functionalization measures. This is of interest in particular for the preparation of fuel and lubricant additives, which as a rule are composed of a hydrophobic hydrocarbon radical, for example a polyisobutenyl group, and a hydrophilic moiety.

The polymers prepared by the novel process suprisingly have a narrow molecular weight distribution. The dispersity D (quotient of the weight average molecular weight $M_w$ divided by the number average molecular weight $M_n$) of the polymers prepared by the novel process is preferably below 1.6, in particular below 1.4, particularly preferably from 1.05 to 1.3.

All data on molecular weights relate to values determined by means of gel permeation chromatography (GPC). The gel permeation chromatography was carried out using THF as mobile phase and $CS_2$ as reference on two columns connected in series (1300 mm, d 7.8 mm), the first column being packed with Styragel HR5 (molecular weight range from 50000 to $4\times10^6$) and the second column with Styragel HR3 (molecular weight range from 200 to 30000) from Waters. The detection was effected by means of a differential refractometer. The standards used for determining the isobutene block were commercial polyisobutene standards in the molar mass range from 224 to 1000000, from Polymer-Standards Service, Mainz, Germany. In the determination of the molecular weight of the block copolymers, a polystyrene calibration file and a UV detector were additionally used.

The examples which follow illustrate the invention without restricting it.

I. Analysis

The determination of the molecular weight was carried out by means of gel permeation chromatography (GPC) against polyisobutene standards in the manner described above.

II. General Preparation Method for a Polymerization Process

Two 1 l dropping funnels with cooling apparatus were placed on a 2 l four-necked flash having a stirrer and cooled with dry ice. Both dropping funnels contained a bed of dry molecular sieve 3 Å over glass wool.

In one dropping funnel, 600 ml of a solvent mixture were dried for 20 minutes at –78° C. The solvent was then metered into the reaction flask, which had been prethermostated at –70° C. Three moles of isobutene were condensed into the other, cooled dropping funnel. The total amount of isobutene was then introduced into the reaction flask in the course of 25 minutes. While maintaining the temperature of –70° C., from 10 to 24 mmol of donor compound II, from 15 to 35 mmol of compound I and then 40 mmol of Lewis acid were then added in succession via a septum with vigorous stirring. After 3 hours, one mole of isopropanol was added at –70° C., the mixture was warmed up to room temperature and the reaction solution was then washed with three times 200 ml of water. The reaction solution was then evaporated down and dried at 200° C. under reduced pressure, finally at 2 mbar. In this way, from about 140 to 160 g of polymer were obtained. The amounts used are shown in table 1. The properties of the polymer are listed in table 2.

TABLE 1

| | Starting materials | | | | |
|---|---|---|---|---|---|
| Example | Donor II[1] | [mmol] | Compound I[2] [mmol] | Lewis Acid | Solvent[3] |
| 1 | A | 15 | CC 35 | TiCl$_4$ | CH$_2$Cl$_2$/Hexane 2:1 |
| 2 | B | 15 | CC 15 | TiCl$_4$ | CH$_2$Cl$_2$/Hexane 2:1 |
| 3 | C | 10 | CC 35 | TiCl$_4$ | Toluene/CH$_2$Cl$_2$/Hexane 1:1:1 |
| 4 | D | 24 | CC 35 | TiCl$_4$ | CH$_2$Cl$_2$/Hexane 2:1 |
| 5 | A | 15 | CC 35 | BCl$_3$ | CH$_2$Cl$_2$/Hexane 2:1 |
| 6 | A | 24 | pDCC 15 | TiCl$_4$ | CH$_2$Cl$_2$/Hexane 2:1 |
| 7 | A | 15 | pDCC 15 | TiCl$_4$ | Toluene/CH$_2$Cl$_2$/Hexane 1:1:1 |
| V1 | Pyridine | 15 | CC 35 | TiCl$_4$ | CH$_2$Cl$_2$/Hexane 2:1 |
| V2 | Pyridine | 24 | pDCC 15 | TiCl$_4$ | Toluene/CH$_2$Cl$_2$/Hexane 1:1:1 |
| V3 | — | — | CC 35 | TiCl$_4$ | CH$_2$Cl$_2$/Hexane 2:1 |

[1] A = Dicyclopentyldimethoxysilane
B = Diisopropyldimethoxysilane
C = Isopropylisobutyldimethoxysilane
D = Toluyltriethoxysilane
[2] CC = Cumyl chloride (2-chloro-2-phenylpropane)
pDCC = p-Dicumyl dichloride (1,4-bis(2-chloroprop-2-yl)benzene)
[3] Parts by volume

TABLE 2

| | Polymer properties | |
|---|---|---|
| Example | Molecular weight M$_n$ [Dalton] | Dispersity [M$_w$/M$_n$] |
| 1 | 5800 | 1.12 |
| 2 | 12300 | 1.18 |
| 3 | 4900 | 1.26 |
| 4 | 4700 | 1.30 |
| 5 | 3200 | 1.08 |
| 6 | 15300 | 1.17 |
| 7 | 12300 | 1.14 |
| V1 | 5200 | 1.31 |
| V2 | 12300 | 1.34 |
| V3 | 4000 | 2.30 |

We claim:

1. A process for the preparation of homo- and copolymers of isobutene by cationic polymerization of isobutene or mixtures of isobutene with ethylenically unsaturated comonomers in the presence of an initiator system comprising:

i) a Lewis acid selected from covalent metal-halogen compounds or covalent semimetal-halogen compounds,
   ii) at least one aprotic organic compound I having at least one functional group FG of the formula FG

where
   X is selected from halogen, C$_1$–C$_6$-alkoxy or C$_1$–C$_6$acyloxy,
   R$^1$ is hydrogen or methyl and
   R$^2$ is methyl,
      with R$^1$ or the moiety to which the functional group FG is bonded, forms a C$_5$- or C$_6$-cycloalkyl ring, or
      is hydrogen when the functional group FG is bonded to an aromatic or olefinically unsaturated carbon atom,
   which, under polymerization conditions, forms a carbocation or cationic complex with the Lewis acid, wherein the organic compound I is selected from compounds of the formula I-A, I-B, I-C, or I-D:

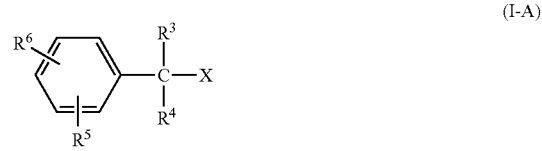

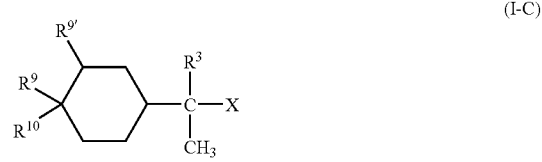

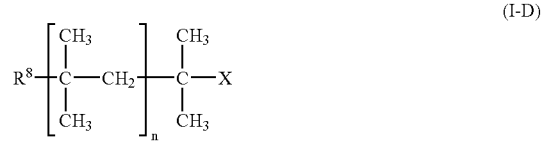

where X has the abovementioned meanings,
   n is 1, 2, 3, 4 or 5,
   R$^3$, R$^4$ and R$^{10}$, independently of one another, are each hydrogen or methyl,
   R$^5$, R$^6$ and R$^7$, independently of one another, are each hydrogen, C$_1$–C$_4$-alkyl or a group CR$^3$R$^4$X, where R$^3$, R$^4$ and X have the abovementioned meanings, and
   R$^8$ is hydrogen, methyl or the group X and
   R$^9$ and R$^{9'}$ are each hydrogen or the group X,
   in an organic solvent which is inert to the Lewis acid, wherein the initiator system additionally comprises
   iii) at least one nonpolymerizable, aprotic organosilicon compound II having at least one Si—O bond.

2. The process as claimed in claim 1, wherein the organosilicon compound is of the formula II:

where n is 1, 2 or 3,
   R$^a$ may be identical or different and, independently of one another, are each C$_1$–C$_{20}$-alkyl, C$_5$–C$_7$-cycloalkyl, aryl or aryl-$C_1$–$C_4$-alkyl, where optionally the three last-mentioned radicals also have one or more $C_1$–$C_{10}$-alkyl groups as substituents, and $R^b$ are identical or different and are each $C_1$–$C_{20}$-alkyl or, where n=1 or 2, two different radicals $R^b$ together may also form a 2- or 3-membered alkylene unit.

3. The process as claimed in claim 1, wherein the Lewis acid is selected from $BF_3$ $TiCl_4$, $SnCl_4$, $BCl_3$, $FeCl_3$, $VCl_5$, $AlCl_3$ or $R^c$—$AlCl_2$, where $R^c$ is $C_1$–$C_6$-alkyl.

4. The process as claimed in claim 3, wherein the Lewis acid is selected from $TiCl_4$ or $BCl_3$.

5. The process as claimed in claim 1, wherein the molar ratio of silicon atoms in the organosilicon compound II to (semi)metal atoms in the Lewis acid is from 0.05:1 to 50:1.

6. The process as claimed in claim 1, wherein the compound I is used in an amount of from $10^{-4}$ to $10^{-1}$ mol, based on the functional groups FG of the compound I, per mol of polymerizable monomer.

7. The process as claimed in claim 1, wherein the molar ratio of the Lewis acid to the functional group FG of compound I is from 20:1 to 1:50.

8. The process as claimed in claim 1, wherein the polymerization is carried out at below 0° C.

9. The process as claimed in claim 1, wherein the solvent is selected from aliphatic or cycloaliphatic hydrocarbons, aromatic hydrocarbons or inert halohydrocarbons.

10. The process as claimed in claim 1, wherein isobutene is copolymerized with at least one vinylaromatic monomer.

11. The process as claimed in claim 10, wherein first isobutene and then the vinylaromatic monomer is polymerized.

12. The process as claimed in claim 1, wherein the polymerization is stopped by adding an aprotic compound.

13. The process as claimed in claim 1, wherein the polymerization is stopped by adding a tri(alkyl)allylsilane compound.

14. The process as claimed in claim 1 which is a; and the living cationic polymerization of isobutene or mixtures of isobutene with ethylenically unsaturated comonomers, wherein compound II functions as a donor.

* * * * *